United States Patent [19]

Hermann et al.

[11] 4,287,107
[45] Sep. 1, 1981

[54] TRANSPARENT POLYVINYL BUTYRAL SHEET AND PROCESS FOR THE MANUFACTURE THEREOF

[75] Inventors: Hans D. Hermann, Bad Soden am Taunus; Albrecht Harréus, Kelkheim, both of Fed. Rep. of Germany

[73] Assignee: Hoechst Aktiengesellschaft, Frankfurt am Main, Fed. Rep. of Germany

[21] Appl. No.: 87,976

[22] Filed: Oct. 25, 1979

[30] Foreign Application Priority Data

Oct. 27, 1978 [DE] Fed. Rep. of Germany ....... 2846837

[51] Int. Cl.³ .................. C08L 91/06; B32B 17/10; B32B 27/42
[52] U.S. Cl. .................. 260/28.5 R; 260/31.8 R; 260/31.8 W; 428/437
[58] Field of Search .................. 428/437, 527, 501; 260/31.8 W, 28.5 R, 31.8 R; 526/315; 525/61

[56] References Cited

U.S. PATENT DOCUMENTS

| 2,955,054 | 10/1960 | Park | 428/501 |
|---|---|---|---|
| 2,991,199 | 7/1961 | Park | 428/501 |
| 3,644,594 | 2/1972 | Mont | 525/57 |
| 3,998,792 | 12/1976 | Hermann | 525/61 |
| 4,035,549 | 7/1977 | Kennar | 428/437 |
| 4,157,990 | 1/1979 | Lidner | 260/31.8 W |
| 4,205,146 | 5/1980 | Hermann | 525/61 |

FOREIGN PATENT DOCUMENTS

| 1187890 | 4/1970 | United Kingdom . | |
|---|---|---|---|
| 1215318 | 12/1970 | United Kingdom | 428/437 |
| 1309615 | 3/1973 | United Kingdom . | |
| 1513541 | 6/1978 | United Kingdom . | |

*Primary Examiner*—Ellis P. Robinson
*Attorney, Agent, or Firm*—Curtis, Morris & Safford

[57] ABSTRACT

The tendency to blocking of polymer sheets can be reduced by means of anti-blocking agents. Suitable anti-blocking agents in transparent polyvinyl butyral sheets are especially montanic acid esters, which do not adversely affect the adhesion of the sheet to glass. The polyvinyl butyral sheets are used as interlayers of laminated glass (safety glass).

20 Claims, No Drawings

TRANSPARENT POLYVINYL BUTYRAL SHEET AND PROCESS FOR THE MANUFACTURE THEREOF

The invention provides a transparent polyvinyl butyral sheet containing a plasticizer and an anti-blocking agent, and a process for the manufacture thereof.

As is known, plasticizer-containing polyvinyl butyral (PVB) can be thermoplastically processed to sheets which are suitable especially as interlayer for safety glass. However, PVB sheets tend to block with one another, which may cause difficulties on storing and processing. This undesirable blocking of the individual sheets can be reduced according to diverse methods, for example mechanical roughening of their surface, powdering with sodium bicarbonate powder, use of intermediate layers of thin non-blocking plastic sheets, or chemical treatment of the surface, especially by means of inorganic acids (see German Offenlegungsschrift No. 21 08 100). It is furthermore usual to store roughened sheets at a temperature of below 10° C., which substantially prevents blocking. However, these methods have the disadvantage of requiring much expenditure because of these additional treatments.

It has furthermore been suggested to reduce the tendency of blocking of polymer sheets made for example from polyolefins or polyvinyl chloride by using suitable anti-blocking agents, such as natural or synthetic waxes, fatty acids or soaps. However, in the case of PVB sheets, these known additives have nearly no effect at all; on the contrary, they often deteriorate the transparency or the mechanical properties of the sheets. Only certain salts and esters of fluorocarboxylic acids have been used in the past as anti-blocking agents for PVB sheets (see Japanese Patent Publication No. 132281/76, referred to in Chemical Abstracts, vol. 86 (1977), No. 56494 g).

It is the object of this invention to provide a transparent sheet on the basis of a plasticizer-containing polyvinyl butyral, the blocking effect of which sheet is reduced due to the addition of an anti-blocking agent, while its adhesion to glass is fully maintained.

The present invention relates to a transparent sheet consisting of a plasticizer-containing polyvinyl butyral which comprises in addition from 0.01 to 2 weight % (relative to the plasticizer-containing polyvinyl butyral) of a montanic acid ester.

The invention provides furthermore a process for the manufacture of a transparent sheet by thermoplastic processing of a plasticizer-containing polyvinyl butyral in the presence of an anti-blocking agent under conditions known per se, which comprises using a montanic acid ester as anti-blocking agent.

The sheet in accordance with the invention contains an amount of from 0.01 to 2, preferably 0.05 to 1, weight % (relative to the plasticizer-containing PVB) of the montanic acid ester; especially preferred is the use of from 0.1 to 0.3 weight % of the montanic acid ester. The optimum amount to be employed depends on the kind of basis polymer and of plasticizer.

As montanic acid ester, there are used above all esters of montanic acid with a mono-, di- or trihydric aliphatic alcohol having preferably from 1 to 30, especially 2 to 10, carbon atoms. Particularly suitable are diesters of montanic acid with a diol, preferably an α,ω-diol, having from 2 to 6 carbon atoms, such as ethyleneglycol, propanediol-(1,3), butanediol-(1,3), butanediol-(1,4) hexanedio-(1,6), diethyleneglycol, triethyleneglycol or tetramethyleneglycol, as well as triesters of montanic acid with a triol having from 3 to 6 carbon atoms, such as glycerol or trimethylolpropane.

The montanic acid esters used in accordance with the invention are prepared in known manner by esterification of montanic acid (obtained from montan wax) with the alcohol in question (see for example Ullmanns Encyklopädie der technischen Chemie, 3rd. ed. (1967), vol. 18, pp. 292 et sequ.). Instead of a montanic acid ester, a mixture of a montanic acid ester and a montanic acid salt, preferably an alkali metal salt or alkaline earth metal salt, may be alternatively used; however, these salts must not adversely affect the transparency of the sheets. The amount of salt is preferably a maximum 50 weight %, especially from 10 to 30 weight % (relative to montanic acid ester). Suitable salts are for example sodium montanate, potassium montanate, magnesium montanate or calcium montanate.

Suitable for the manufacture of the sheet in accordance with the invention is in principle any polyvinyl butyral which can be thermoplastically processed. Preferably, a PVB having from 17 to 24 weight %, especially 19 to 22, weight %, of vinyl alcohol units is used. The viscosity of the 5 weight % solution of PVB in ethanol (measured according to German Industrial Standard DIN 53 015 at 23° C.) is preferably in the range of from 10 to 200 mPa.s, especially 50 to 100 mPa.s. The content of vinyl acetate units may be of up to 3 weight %; especially it is in the range of from 0.5 to 2 weight %.

Polyvinyl butyral to be thermoplastically processed contains usually a plasticizer. The PVB sheet in accordance with the invention contains a usual amount of plasticizer, preferably of from 20 to 60 weight %, especially 30 to 50 weight % (relative to the PVB amount). Suitable plasticizers are above all diesters of aliphatic diols with long-chain aliphatic carboxylic acids, especially diesters of diethyleneglycol or triethyleneglycol with aliphatic carboxylic acids having from 6 to 10 carbon atoms, for example butyric, caproic, 2-ethylbutyric or diethylacetic acid.

Furthermore, there may be used diesters of dicarboxylic acids having from 6 to 10 carbon atoms with higher alcohols, for example dibutyl sebacate or bis(β-butoxymethyl)-adipate, as well as phthalic acid diesters such a dioctyl phthalate, phosphoric acid triesters such as tricresyl phosphate, or glycerol monooleate.

The sheet in accordance with the invention may contain further additives which protect the PVB against degradation and oxidation, i.e. compounds having an alkaline reaction, for example alkali metal salts of weak organic acids, furthermore phenolic stabilizers, for example phenols substituted in 2-, 4- and/or 6-position, bisphenols or terpenephenols. In addition, the sheet may contain substances having an influence on its adhesion to glass surfaces, for example carboxylic acid salts, fluorides, lecithin or alkylene ureas. The corresponding additive is used generally in an amount of from 0.001 to 1 weight % of the total mixture.

The sheet in accordance with the invention is manufactured in known manner by thermoplastic processing of a mixture of polyvinyl butyral, plasticizer and anti-blocking agent, preferably by extrusion of the above mixture through a slot die. Normally, the montanic acid ester is used in the form of a fine powder; its dissolution in the corresponding plasticizer, possibly with heating, is however preferred in accordance with the invention.

The cited components are mixed either at normal or at slightly elevated temperature, that is, of from 30° to 80° C., and thermoplastic processing is preferably carried out at a temperature of from 170° to 230° C. The thickness of the sheets obtained by extrusion is generally from 0.2 to 2 mm, preferably 0.3 to 1 mm. The sheets are clear and transparent.

It is recommended to store the sheets directly after their manufacture for a certain time, that is, from 1 to 48 hours, depending on the kind of anti-blocking agent, at a temperature below room temperature, preferably of from 5° to 15° C. Furthermore, it is advantageous to roughen or emboss the surface of the sheets; especially useful is a groove embossment in longitudinal direction of the sheet.

As compared to conventional sheets, the sheets in accordance with the invention have the advantage of a considerably reduced tendency to blocking due to the addition of an easily obtainable anti-blocking agent. This is especially surprising in view of the fact that the anti-blocking agent is used in a very low concentration.

The sheet in accordance with the invention is especially suitable as interlayer for laminated glass such as it is required in the automotive and the building industries. Such laminated glass is manufactured in known manner, for example by compressing the sheet between two glass panes at a temperature of from 120° to 160° C. and a pressure of from 5 to 20 bars. Separation of the anti-blocking agent in the laminated glass has not been observed.

In a "blocking test", the blocking behavior of the sheets in accordance with the invention is tested as follows: A sheet having a thickness of about 1 mm is first extruded from a polyvinyl butyral/plasticizer/anti-blocking agent mixture. By compression at 150° C. between two finely matted cellulose triacetate sheets, a sheet having a thickness of 0.8 mm and a microinch finish of less than 0.005 mm is then manufactured from the extruded sheet. Strips having dimensions of 15 mm × 100 mm are cut from the sheet so obtained, which strips are stored for 3 days at a temperature of 23° C. and a relative atmospheric moisture of 50% (standard climate 23/50). Subsequently, two strips each are superposed congruently and subjected over a length of 50 mm to a pressure of 0.1 bar for 15 hours in the 23/50 standard climate. Blocking of the halves of the strips which are not subjected to the pressure is prevented by intermediate layers of anti-adhesive paper. Each pair of strips adhering to each other for one half which is obtained in this manner is suspended freely by means of a clip from a non-adhering end of strip; to the non-adhering end of the adjacent strip a weight is fixed by means of a second clip (200 g including clip), which weight causes the two adhering strips to separate. The time which passes until complete separation of the adhering strips is defined as blocking time (average from 4 tests each).

The following examples illustrate the invention; amounts and percentages being by weight unless otherwise stated.

EXAMPLE 1

(a) 0.14 part (=0.1%, relative to the total amount of PVB and plasticizer) of montanic acid-butanediol-(1,3) diester is dissolved in 39 parts of diesters of triethyleneglycol with a mixture of aliphatic monocarboxylic acids having from 6 to 9 carbon atoms while heating to 100° C. This solution was mixed at room temperature with 100 parts of a pulverulent polyvinyl butyral containing 19.8% of vinyl alcohol units the 5% solution of which in ethanol had a viscosity of 70 mPa.s.

(b) The molding composition so obtained was extruded in an extruder at a temperature of 180° C. to give a transparent sheet having a thickness of about 1 mm. The "blocking test" of this sheet showed a blocking time of 90 s. A sheet manufactured in analogous manner, but without the use of an anti-blocking agent had a blocking time of 1,500 s in the "blocking test".

EXAMPLE 2

A sheet was manufactured and tested according to Example 1, in which a PVB was used which contained 20.5% of vinyl alcohol units and the 5% solution of which in ethanol had a viscosity of 95 mPa.s. The amount of plasticizer was 42 parts and that of the anti-blocking agent was 0.24 parts (=0.2%, relative to the total amount of PVB and plasticizer). The "blocking test" for the clear and transparent sheet resulted in a blocking time of zero s. A sheet manufactured in analogous manner, but without the use of an anti-blocking agent had a blocking time of 1,000 s in the "blocking test".

EXAMPLE 3

(a) A sheet was manufactured and tested according to Example 1, in which a PVB was used which contained 21.5% of vinyl alcohol units and the 5% solution of which in ethanol had a viscosity of 81 mPa.s. As plasticizer there was used the diester of triethyleneglycol with 2-ethylbutyric acid in an amount of 43 parts. As anti-blocking agent, 0.29 part (=0.2%, relative to the total amount of PVB and plasticizer) was used. The blocking time of the clear and transparent sheet having a thickness of 0.8 mm in the "blocking test" was 250 s.

The blocking time of a sheet manufactured in analogous manner but without the use of an anti-blocking agent in the "blocking test" was 1,800 s.

(b) A sheet having a thickness of 0.8 mm and dimensions of 100 mm × 150 mm was manufactured from the molding composition obtained according to a), and pressed for 5 minutes at a temperature of 145° C. and a pressure of 10 bars onto a glass plate having identical dimensions. For reinforcement, an unextendable fabric of polyamide was pressed into the compound on the face of the sheet turned away from the glass plate. The laminate so obtained was then cut in strips having dimensions of 15 mm × 100 mm, and these strips where stored for 3 days in the 23/50 standard climate. Subsequently, the sheet strip of the laminate was pulled off the glass strip for a length of 3 cm. Then, the laminate strip was clamped horizontally in a tensile strength testing apparatus and the sheet strip pulled off vertically upward at a speed of 20 cm/min. The strain required in these tests is the measure for the peel resistance (average of eight tests each). The peel resistance was 45 N/cm and was unchanged even after a six months' storing in the 23/50 standard climate.

EXAMPLE 4

A sheet was manufactured and tested according to Example 1, in which a PVB was used which contained 21.5% of vinyl alcohol units and the 5% solution of which in ethanol had a viscosity of 81 mPa.s. As plasticizer, there was employed the diester of triethyleneglycol with 2-ethylbutyric acid in an amount of 43 parts. A clear and transparent sheet was obtained which had a blocking time of 100 s in the "blocking test". A laminated glass manufactured with the use of this sheet was completely transparent still after a one year storage at 23° C.

EXAMPLE 5

A sheet was manufactured and tested according to Example 1 with the use of a PVB containing 20.8% of vinyl alcohol units the 5% solution of which in ethanol had a viscosity of 105 mPa.s. The amount of plasticizer employed was 42 parts. As anti-blocking agent, there was used montanic acid-butanediol-(1,4) diester in an amount of 0.28 part (=0.2% relative to the total amount of PVB and plasticizer).

The "blocking test" was carried out in a modified form: storage before compression was only 2 hours, and the time of strain was 16 hours. A blocking time of 25 s resulted. For a sheet manufactured in analogous manner but without the use of an anti-blocking agent, the blocking time in the modified "blocking test" was 2,000 s.

EXAMPLE 6

A sheet was manufactured and tested according to Example 1, using a PVB which contained 21.9% of vinyl alcohol units and the 5% solution of which in ethanol had a viscosity of 63 mPa.s. The amount of anti-blocking agent was merely 0.07 part (=0.05%, relative to the total amount of PVB and plasticizer). The clear and transparent sheet had a blocking time of 150 s in the "blocking test".

The blocking time in the "blocking test" of a sheet manufactured in analogous manner but without the use of an anti-blocking agent was 800 s.

EXAMPLE 7

(a) 100 parts of pulverulent PVB containing 20.5% of vinyl alcohol units the 5% solution of which in ethanol had a viscosity of 70 mPa.s were mixed first with 0.42 part (=0.3%, relative to the total amount of PVB and plasticizer) of finely powdered montanic acid-n-butyl ester and subsequently with 40 parts of diesters of triethyleneglycol with a mixture of hexanecarboxylic acids.

(b) According to Example 1b), a sheet was manufactured from the molding composition so obtained, and tested. The result of the "blocking test" was a blocking time of 10 s. The blocking time in the "blocking test" of a sheet manufactured in analogous manner but without the use of an anti-blocking agent was 1,000 s.

EXAMPLE 8

A sheet was manufactured and tested according to Example 1, using a PVB containing 20.5% of vinyl alcohol units the 5% solution of which in ethanol had a viscosity of 95 mPa.s. 42 Parts of plasticizer were employed. As anti-blocking agent, a mixture of montanic acid-ethyleneglycol ester and calcium montanate (15%, relative to the amount of ester) was used. The blocking time of the clear and transparent sheet in the "blocking test" was 20 s.

COMPARATIVE EXAMPLES

According to Example 1, molding compositions and sheets were manufactured with the use of 100 parts of PVB containing 20.5% of vinyl alcohol units the 5% solution of which in ethanol had a viscosity of 95 mPa.s, 42 parts of the plasticizer according to Example 1 and 0.2% each (relative to the total amount of PVB and plasticizer) of different additives having an anti-blocking effect in other polymers than PVB. The appearance of the sheets was examined, and the blocking time was determined in the "blocking test". The results are listed in the following Table.

| Test | Additive | Blocking time (s) | Appearance of the sheet |
|---|---|---|---|
| a | LD-polyethylene wax (m.p. 105–110° C.) | 900 | turbid |
| b | glycerol ester of fatty acids having 14–18 carbon atoms | 1,000 | clear |
| c | stearic acid octyl ester | 800 | clear |

What is claimed is:

1. An interlayer for laminated glass comprising a plasticizer-containing polyvinyl butyral, and from 0.05 to 1 weight % (relative to the plasticizer-containing polyvinyl butyral) of a montanic acid ester, wherein the ester is a diester or a triester.

2. The interlayer of claim 1, wherein the polyvinyl butyral contains from 17 to 24 weight % of vinyl alcohol units.

3. The interlayer of claim 1, wherein the polyvinyl butyral is a polyvinyl butyral, the 5% solution of which in ethanol at 23° C. has a viscosity in the range of from 10 to 200 mPa.s.

4. The interlayer of claim 1, wherein the montanic acid ester is an ester of montanic acid with a di- or trihydric aliphatic alcohol.

5. The interlayer of claim 4, wherein the montanic acid ester is an ester of montanic acid with an alcohol having from 1 to 30 carbon atoms.

6. The interlayer of claim 4, wherein the montanic acid ester is a diester of montanic acid with a diol.

7. The interlayer of claim 4, wherein the montanic acid ester is a triester of montanic acid with a triol.

8. The interlayer of claim 1, wherein the amount of plasticizer is from 20 to 60 weight % of the amount of polyvinyl butyral.

9. A process for the manufacture of a an interlayer for laminated glass by thermoplastic processing of a plasticizer-containing polyvinyl butyral in the presence of an anti-blocking agent under conditions know per se, which comprises using a montanic acid diester or triester in an amount of 0.05 to 1 weight %, relative to the plasticizer-containing polyvinyl butyral, as anti-blocking agent.

10. The interlayer of claim 1, wherein the montanic acid ester is used in an amount of 0.1 to 0.3 weight % relative to the plasticizer containing polyvinyl butyral.

11. The interlayer of claim 4, wherein the alcohol is butanediol-(1,4), ethyleneglycol or glycerol.

12. The interlayer of claim 3, wherein the viscosity is in the range of 50 to 100 mPa.s.

13. The interlayer of claim 4, wherein the diol is ethyleneglycol, propanediol-(1,3), butanediol-(1,3), butanediol-(1,4), hexanediol-(1,6), diethyleneglycol, triethyleneglycol or tetramethyleneglycol.

14. The interlayer of claim 4, wherein the triol is glycerol or trimethylolpropane.

15. The interlayer of claim 2, wherein the polyvinyl butyral contains from 19 to 22 weight % of vinyl alcohol units.

16. The interlayer of claim 1, comprising a plasticizer-containing polyvinyl butyral and from 0.05 to 1 weight % relative to the plasticizer-containing polyvinyl butyral, of a mixture of a montanic acid ester and a montanic acid salt, wherein the salt is present in an amount not exceeding 50 weight %, relative to the montanic acid ester and wherein the ester is a diester or a triester.

17. The interlayer of claim 16, wherein the salt is present in an amount from 10 to 30 weight % relative to the montanic acid ester.

18. The interlayer of claim 17, wherein the salt is sodium montanate, potassium montanate, magnesium montanate or calcium montanate.

19. The interlayer of claim 1, wherein the plasticizer containing polyvinyl butyral contains a plasticizer in an amount of 20 to 60 weight % relative to the polyvinyl butyral.

20. The interlayer of claim 18, wherein the plasticizer is contained in an amount from 30 to 50 weight %, relative to the polyvinyl butyral.

* * * * *